US008733706B1

(12) United States Patent
Fernandez et al.

(10) Patent No.: US 8,733,706 B1
(45) Date of Patent: May 27, 2014

(54) TRANSFORMABLE AND RECONFIGURABLE ENTRY, DESCENT AND LANDING SYSTEMS AND METHODS

(75) Inventors: Ian M. Fernandez, Boulder Creek, CA (US); Ethiraj Venkatapathy, Los Altos, CA (US); Kenneth R. Hamm, Tracy, CA (US)

(73) Assignee: The United States of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 203 days.

(21) Appl. No.: 13/472,283

(22) Filed: May 15, 2012

(51) Int. Cl.
*B64C 1/10* (2006.01)
(52) U.S. Cl.
USPC ............... 244/158.7; 244/159.1; 244/139
(58) Field of Classification Search
USPC ............ 244/158.7, 159.1, 139, 172.6, 110 D, 244/138 A
See application file for complete search history.

(56) References Cited

U.S. PATENT DOCUMENTS

| | | | | |
|---|---|---|---|---|
| 4,832,288 | A * | 5/1989 | Kendall et al. | 244/159.2 |
| 4,896,847 | A * | 1/1990 | Gertsch | 244/159.1 |
| 5,108,047 | A * | 4/1992 | Puech | 244/113 |
| 5,201,832 | A * | 4/1993 | Porter et al. | 244/158.7 |
| 6,550,720 | B2 * | 4/2003 | Fleeter et al. | 244/158.7 |
| 7,837,154 | B2 * | 11/2010 | Trabandt et al. | 244/159.1 |

OTHER PUBLICATIONS

Drake, Bret G., editor, "Human Exploration of Mars Design Reference Architecture 5.0," NASA-SP-2009-566, Jul. 2009.
Dwyer-Cianciolo, A. M. et al.,"Entry, Descent and Landing Systems Analysis Study: Phase 1 Report," NASA/TM-2010-216720, Jul. 2010.
Goetz, A. C., and Jensen, D. L., "Deployable Heatshields for Future Multistage Missiles," Journal of Spacecraft and Rockets, vol. 17, No. 1, pp. 53-57, 1980.
Venkatapathy, E. et al., "Adaptive Deployable Entry and Placement Technology (ADEPT):A Feasibility Study for Human Missions to Mars," AIAA-2011-2608, 21st AIAA Aerodynamic Decelerator Systems Technology Conference and Seminar, Dublin, Ireland, May 23-26, 2011.
Beck, R, White, S, Arnold, J, Fan, W, Stackpoole, M, Agrawal, P, and Coughlin, S, "Overview of Initial Development of Flexible Ablators for Hypersonic Inflatable Aerodynamic Decelerators," AIAA Paper presented at the 21st AIAA Aerodynamic Decelerators Conference and Seminar, Dublin, Ireland, May 2011.
Edquist, K. T. et al., "Aerothermodynamic Design of the Mars Science Laboratory Heatshield," AIAA 2009-4075, 41st AIAA Thermophysics Conference, San Antonio, TX, Jun. 2009.

(Continued)

*Primary Examiner* — Christopher P Ellis
(74) *Attorney, Agent, or Firm* — Christopher J. Menke; Robert M. Padilla (57) ABSTRACT

A deployable aerodynamic decelerator structure includes a ring member disposed along a central axis of the aerodynamic decelerator, a plurality of jointed rib members extending radially from the ring member and a flexible layer attached to the plurality of rib members. A deployment device is operable to reconfigure the flexible layer from a stowed configuration to a deployed configuration by movement of the rib members and a control device is operable to redirect a lift vector of the decelerator structure by changing an orientation of the flexible layer.

20 Claims, 10 Drawing Sheets

(56) References Cited

OTHER PUBLICATIONS

McGuire M. K. et al., "TPS Selection and Sizing Tool Implemented in and Advanced Engineering Environment," AIAA-2004-342, 42nd AIAA Aerospace Sciences Meeting and Exhibit, Reno NV, Jan. 2004.

Milos, F.S. and Chen, Y-K, "Two-Dimensional Ablation, Thermal Response, and Sizing Program for Pyrolyzing Ablators," AIAA Paper 2008-1223, AIAA Aerospace Sciences Meeting and Exhibition, Jan. 2008.

* cited by examiner

TRANSFORMABLE AND RECONFIGURABLE ENTRY, DESCENT AND LANDING SYSTEMS AND METHODS

ORIGIN OF INVENTION

The invention described herein was made by employees of the United States Government and may be manufactured and used by or for the Government of the United States of America for governmental purposes without the payment of any royalties thereon or therefor.

TECHNICAL FIELD OF THE INVENTION

The present disclosure relates generally to aerodynamic decelerators. More particularly, the present disclosure relates to transformable and reconfigurable, aerodynamic decelerator systems.

BACKGROUND OF THE INVENTION

Conventionally, entry, descent and landing (EDL) technology utilizes a rigid aeroshell structure for both aerodynamic braking and thermal protection of a payload. Typically, the rigid aeroshell structure has a size that is constrained by the launch vehicle carrying the rigid aeroshell structure (i.e., the size is constrained to a size that fits within the launch vehicle). Due to such size limitations of the rigid aeroshell structure, the mass of the payload for which the rigid aeroshell structure is designed is also limited. The limitations of size and the resulting mass that can be packaged within the rigid aeroshell structure often results in a severe entry condition.

Increasingly, large missions and campaigns to near and far solar system destinations, such as inner and outer planets and moons, as well as human and sample return to Earth, are planned. Such large missions and campaigns require large payloads and heatshield structures capable of safely and effectively landing the payload at these destinations.

The effectiveness of the rigid aeroshell structure for aerodynamic braking and thermal protection is dependent upon, among other factors, the size of the structure and the density of the atmosphere in which the rigid aeroshell structure is utilized. For a planet such as Mars, the atmosphere is not dense enough to allow typical rigid aeroshell structures to be effective for payloads over approximately two metric tons (mT). However, the Martian atmosphere is dense enough to cause significant heating from aerodynamic friction during descent.

Further, typical EDL technologies utilize a reaction control system (RCS) using propulsive thrust for directional control of the payload during descent. However, conventional propulsive thrust technologies may be inefficient and inadequate for large payloads.

BRIEF DESCRIPTION OF THE INVENTION

In one aspect a deployable aerodynamic decelerator structure includes a ring member disposed along a central axis of the aerodynamic decelerator, a plurality of jointed rib members extending radially from the ring member and a flexible layer attached to the plurality of rib members. A deployment device is operable to reconfigure the flexible layer from a stowed configuration to a deployed configuration by movement of the rib members, and a control device is operable to redirect a lift vector of the decelerator structure by changing an orientation of the flexible layer.

In another aspect, an entry, and decent system includes a ring member disposed along a central axis of the system, a plurality of rib members hinged and connected to the ring member, and a flexible layer attached to the plurality of rib members. A deployment device is operable to reconfigure the flexible layer and the plurality of rib members by movement of the rib members to control and redirect the lift vector of the decelerator structure during entry and descent maneuvers.

In another aspect, an entry, decent and landing system includes a ring member disposed along a central axis of the system, a plurality of rib members hingedly connected to the ring member, and a flexible layer attached to the plurality of rib members. A deployment device is operable to reconfigure the flexible layer from a deployed configuration to a landing configuration by moving the ring member along the central axis and a payload adaptor member is configured to connect the system to a payload.

In yet another aspect, a method of landing a payload includes providing a payload and attaching the payload to a deployable aerodynamic decelerator structure. The structure includes a ring member disposed along a central axis of the aerodynamic decelerator, a plurality of jointed rib members extending radially from the ring member, a flexible layer attached to the plurality of rib members, a deployment device operable to reconfigure the flexible layer from a stowed configuration to a deployed configuration, and a control device operable to redirect a lift vector of the decelerator structure. The deployment device is operated to reconfigure the flexible layer into the deployed configuration to attenuate the impact energy experienced by the payload. The control device is operated to redirect the lift vector of the decelerator structure and the deployment device is operated to reconfigure the flexible layer into a landing configuration.

DETAILED DESCRIPTION OF THE INVENTION

The transformable and reconfigurable aerodynamic decelerator systems of the present disclosure are stowable within an air vehicle or launch vehicle. For example, the aerodynamic decelerators are deployable into a large aerosurface for aerocapture and atmospheric entry and descent. The aerodynamic decelerator systems are, in one embodiment, reconfigurable for efficient control during flight and include thermal protection materials. The aerodynamic decelerator systems, in another embodiment, are transformable into a final landing configuration. The aerodynamic decelerator systems described herein may also be referred to as Adaptive DEployable Placement Technology (ADEPT).

Figure 1:
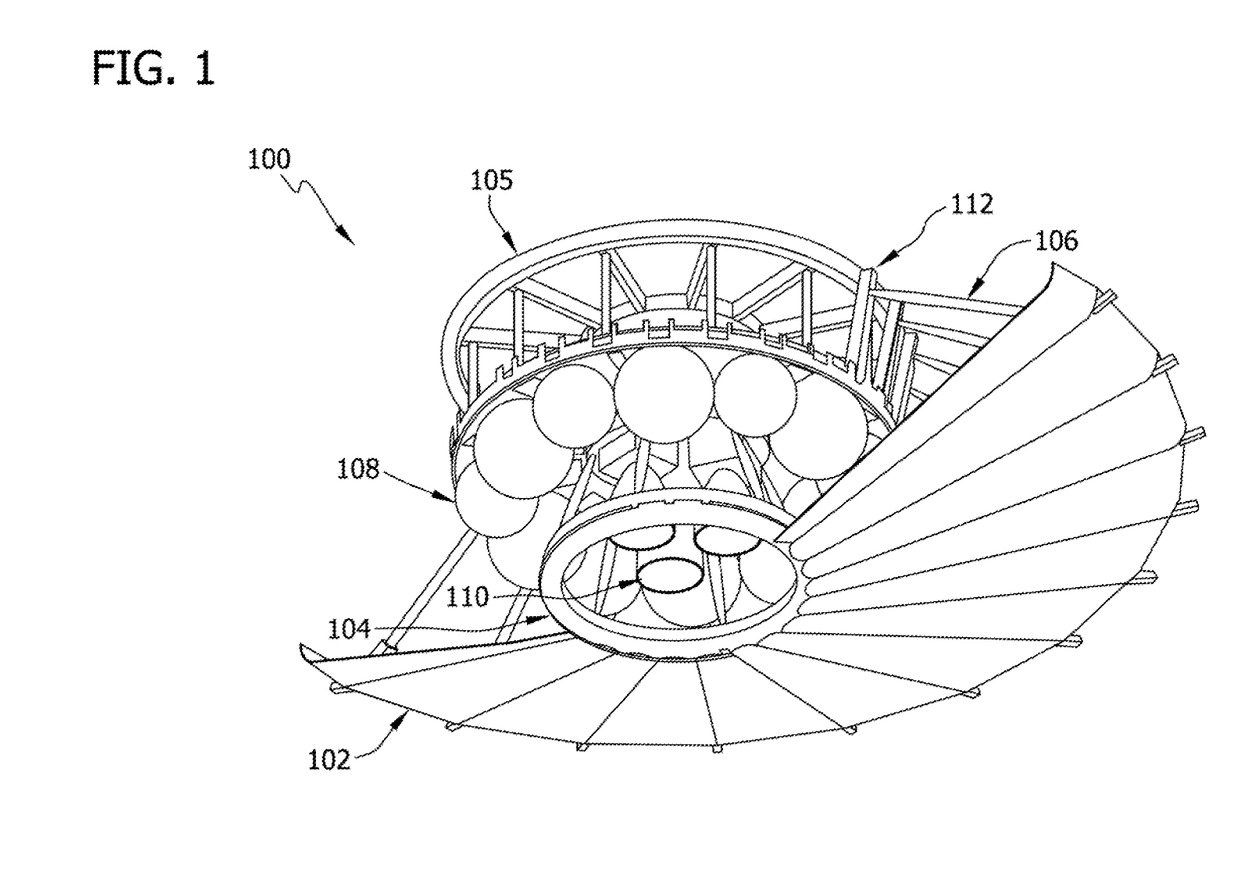
FIG. 1 is perspective view of an aerodynamic decelerator system according to the present disclosure.

Shown generally in FIG. 1 is an exemplary embodiment of an aerodynamic decelerator 100 according to the present disclosure. The aerodynamic decelerator includes a flexible layer 102, ring member 104, payload adaptor member 105, a plurality of links 106, a plurality of fuel storage containers 108, a retro propulsion device 110, and a deployment device 112.

Figure 2:
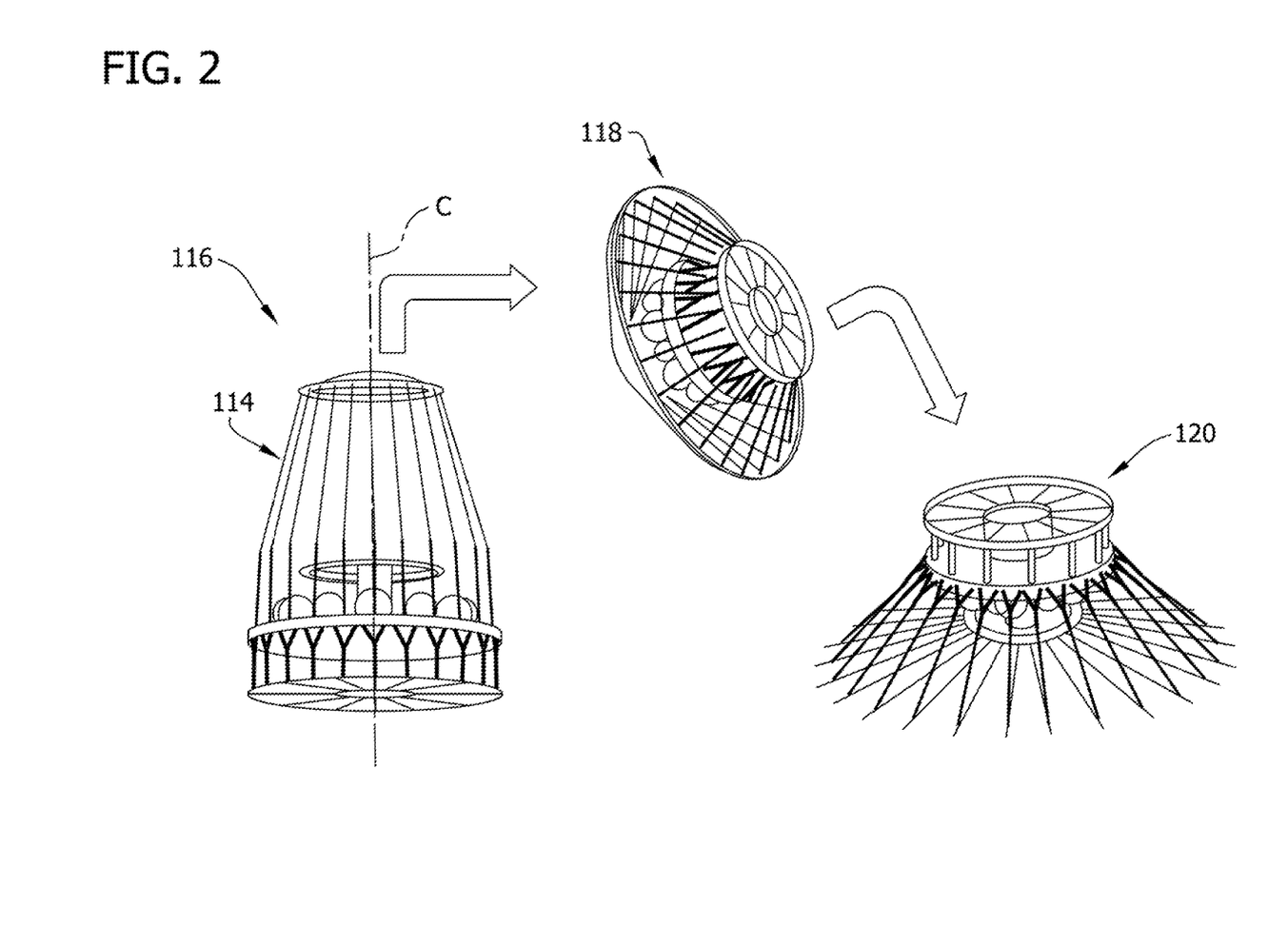
FIG. 2 shows the aerodynamic decelerator system of FIG. 1 in each of three exemplary configurations.

In one embodiment, flexible layer 102 spans between a plurality of rib members, such as spokes 114 (shown in FIG. 2). In another embodiment, flexible layer 102 is connected to spokes 114 via an integral continuous member (not shown) that is woven into flexible layer 102. In one embodiment, each continuous tang extends substantially along the entire length of the each respective spoke.

Figure 3:
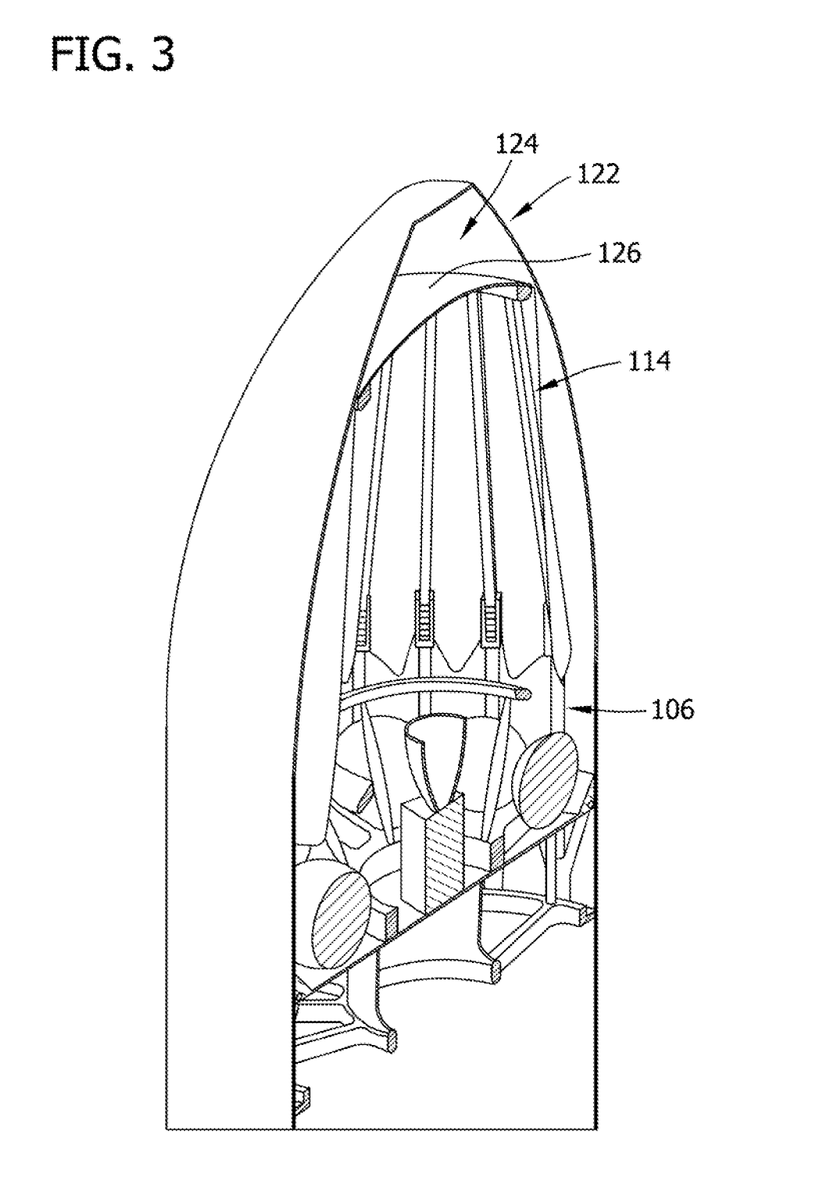
FIG. 3 shows the aerodynamic decelerator system of FIG. 1 in a first configuration and stowed within a launch vehicle.

Shown generally in FIG. 2 are three exemplary configurations of aerodynamic decelerator 100 according to the present disclosure. The three configurations include: stowed configuration 116, deployed configuration 118 and landing configuration 120. In one embodiment, stowed configuration 116 is a configuration allowing aerodynamic decelerator structure 100 to fit inside a shroud 122 of a launch vehicle, for example as shown in FIG. 3. In stowed configuration 116, aerodynamic decelerator 100 is configured to fit within a volumetric envelope 124 of shroud 122. A ratio of the diameter of the stowed configuration to the deployed configuration may be referred to as a packaging efficiency. In embodiments, the packaging efficiency may be between about 2 to 5 (i.e., in a linear dimensional ratio). For example, for an exemplary Mars mission, the packaging efficiency is between about 2.3 to 4.4 (i.e., the stowed configuration diameter is 10 m whereas the deployed configuration diameter is between about 23 m to 44 m). For an exemplary mission to Venus, the packaging efficiency is about 4.0.

In one embodiment, flexible layer 102 is attached to ring member 104 and deployment device 112 in a manner that allows the flexible layer to fold around links 106 and spokes 114, for example straight radial folds (e.g., similar to an umbrella) and the like. In stowed configuration 116, links 106 and spokes 114 extend longitudinally outward with respect to a central axis C of aerodynamic decelerator 100, as shown in an exemplary manner in FIG. 3. In one embodiment, stowed configuration 116 allows for a minimum bend radius of flexible layer 102 to be approximately 40-60 mm, more particularly approximately 51 mm. In other embodiments, the minimum bend radius is any radius that allows the aerodynamic decelerator to function as described herein. In another embodiment, rigging (not shown) is utilized to constrain flexible layer 102 against launch loads.

Figure 4:
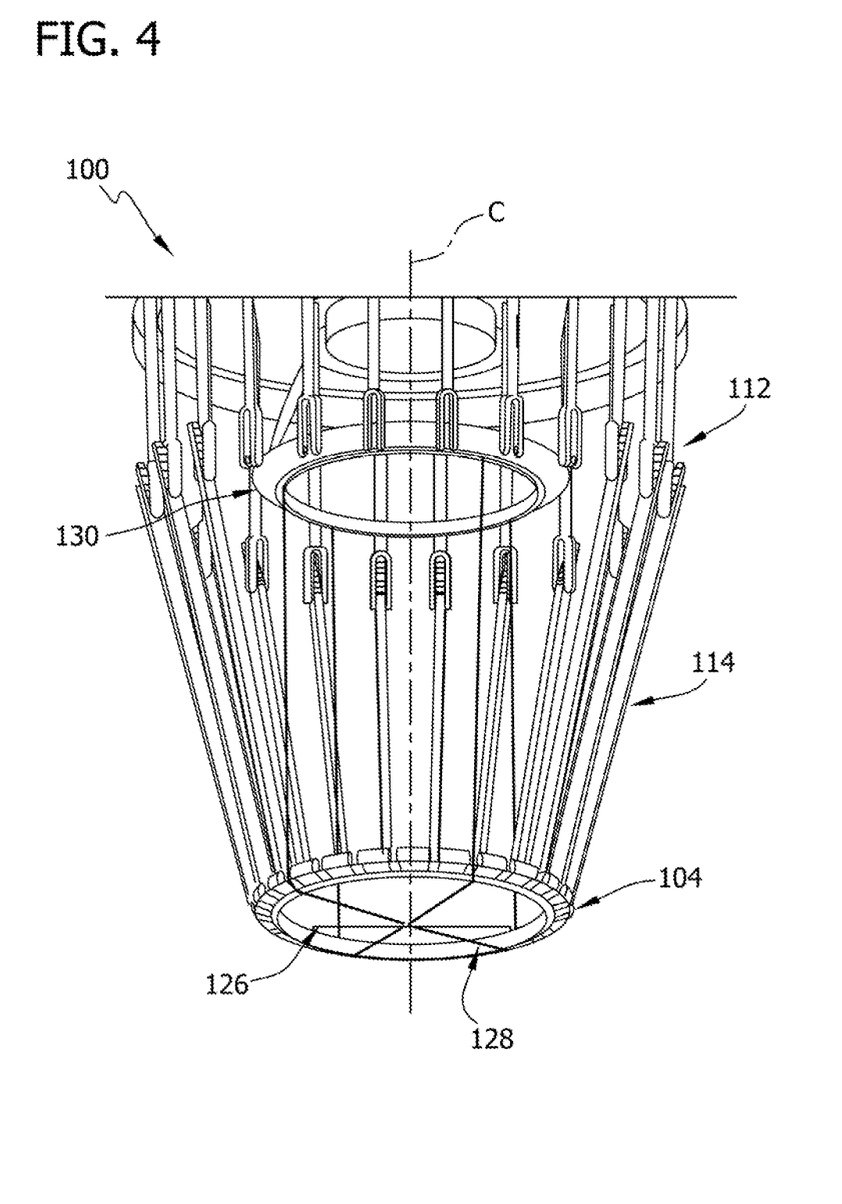
FIG. 4 shows the aerodynamic decelerator system of FIG. 1 including cables for deployment.

Aerodynamic decelerator 100 is configured to extend into one or more deployed configurations. For example, after leaving Earth orbit (e.g., outside of Earth's atmosphere) and before entry into a planetary or moon atmosphere when there is little to no aerodynamic loading, aerodynamic decelerator structure 100 is reconfigured to deployed configuration 118. Generally, such deployment occurs after shroud 122 is ejected or otherwise removed. In some embodiments, aerodynamic decelerator 100 is deployed in one or more partial deployment stages. Shown generally in FIG. 4 is an exemplary embodiment of deployment device 112. In some embodiments, deployment device 112 includes one or more electrical and mechanical components configured to deploy flexible layer 102 to deployed configuration 118.

Figure 5:
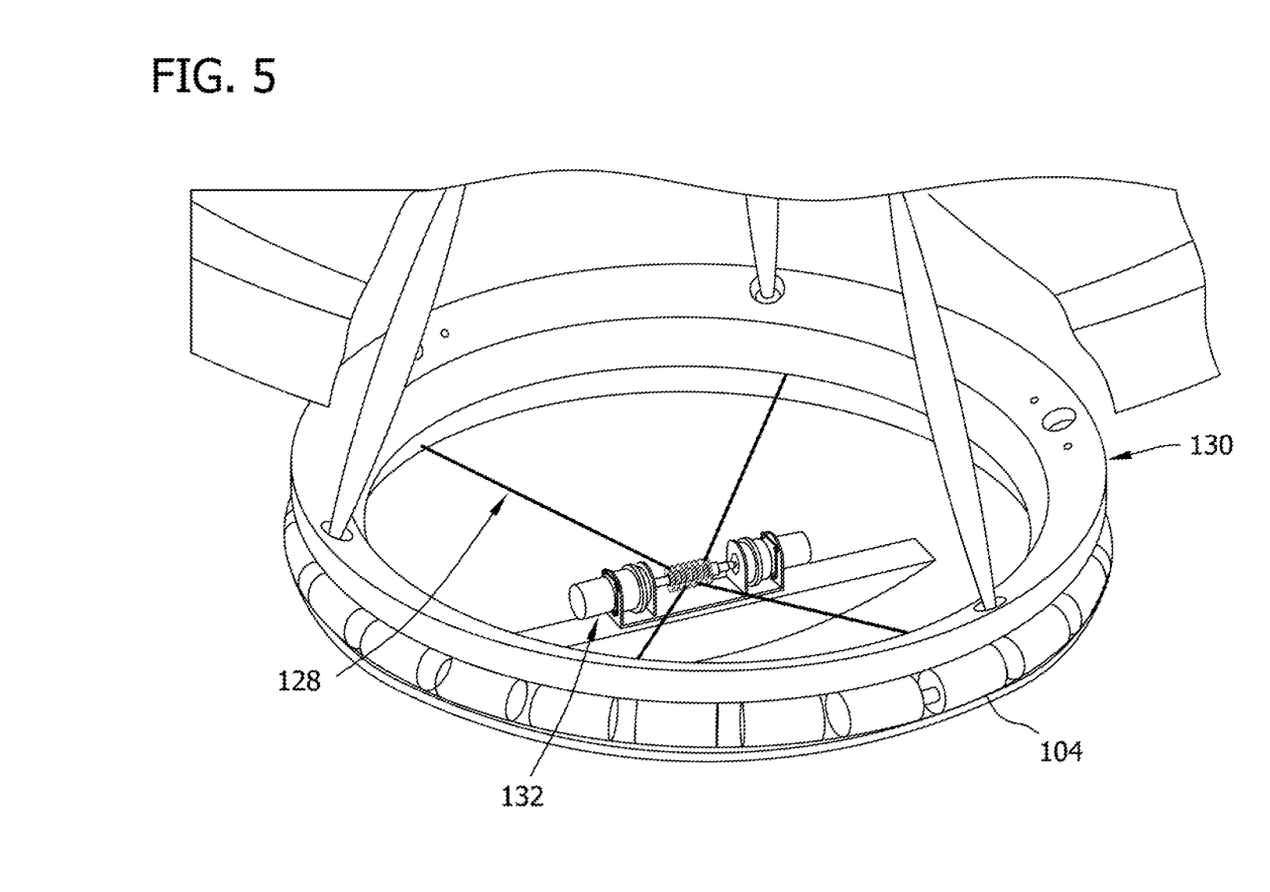
FIG. 5 shows a close-up view of the aerodynamic decelerator of FIG. 4 including a cable deployment mechanism.

In one embodiment, a nose 126 is removably attached to ring member 104 by an adhesive, mechanical attachment such as clasps or the like. In another embodiment, nose 126 and/or flexible layer 102 is made of a heat shielding material, such as a flexible thermally protective shield. In some embodiments, the thermally protective shield material is Silicone Impregnated Reusable Carbon Ablator (SIRCA) material or Phenolic Impregnated Carbon Ablator (PICA) material or the like. In other embodiments, the thermally protective shield material is made of any suitable ablative material. Ring member 104 is hingedly connected to spokes 114 around central axis C of aerodynamic decelerator 100. Deployment of aerodynamic decelerator 100 to deployed configuration is accomplished, in one embodiment, by use of cables 128. In one embodiment, cables 128 are made of Dyneema® fiber ropes, however cables 128 may be made of any material that allows aerodynamic decelerator 100 to function as described herein. Cables 128 are affixed to ring member 104 and are configured to pull ring member 104 longitudinally along central axis C with respect to a control device 130. As ring member 104 is pulled along the longitudinal axis, spokes 114 extend radially outwardly from the hinged connection to expand flexible layer 102 into deployed configuration 118. Extending spokes radially outwardly, unfolds and/or stretches flexible layer, as shown for example in FIG. 6 into deployed configuration 118. In one embodiment, as shown in FIG. 5, cables 128 are spooled/pulled using a winding device 132 (e.g., a winch), which may be mounted in a central region of nose 126. Each of cables 128 may be individually wound on a separate pulley to individually control a length of each of cables 128. In one embodiment, winding device 132 is connected to a controller which allows an operator to control the extent of deployment. In one embodiment, winding device 132 includes dual motors and/or gearboxes for redundancy. In another embodiment, actuators (not shown), such as hydraulic, pneumatic or electromechanical actuators, are utilized to push/pull ring member 104 longitudinally along central axis C. In deployed configuration 118, aerodynamic decelerator structure has an increased drag coefficient as compared to stowed configuration 116 and is thus is configured for atmospheric aerocapture.

Figure 6:
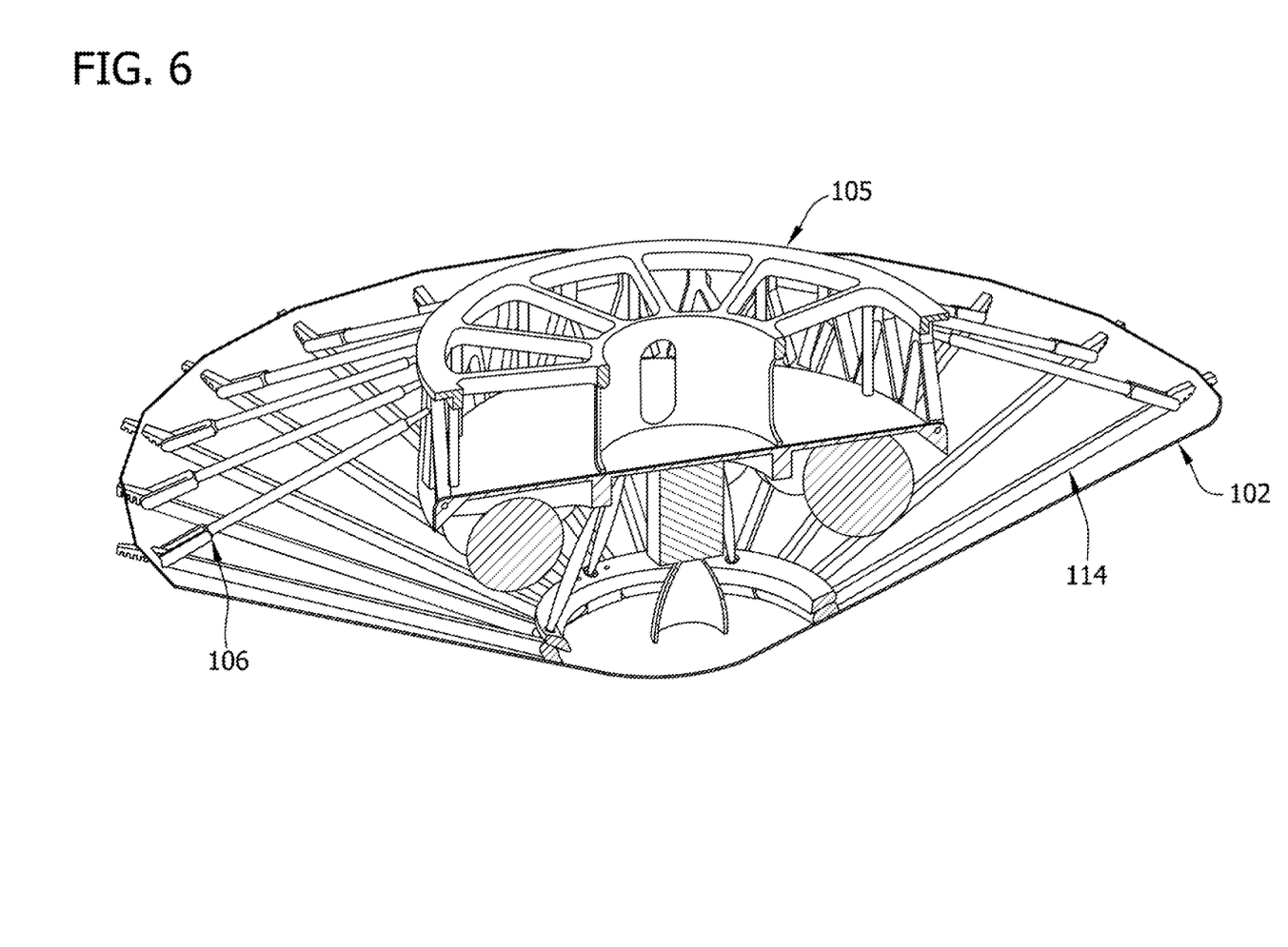
FIG. 6 shows a perspective view of the aerodynamic decelerator of FIG. 1 in an exemplary deployed configuration.

In one embodiment, to substantially prevent excessive local heating due to sudden acceleration of the air or other gases flowing around the shoulder from the high pressure to low pressure regions, a shoulder radius is formed at or near the end of deployment using a mechanism (not shown) that bends edges of the flexible layer inwardly (i.e., in a hoop direction). When in deployed configuration 118, flexible layer 102 extends between spokes 114 and/or links 106 (as shown in FIG. 6), which allows for the flexible layer to transfer an aerodynamic load to payload adaptor 105. In deployed configuration 118, flexible layer 102 also functions as a thermal shield to other components of aerodynamic decelerator 100. In some embodiments, flexible layer 102 forms a sphere-cone shape in deployed configuration 118, such as a 70° sphere cone shape.

Figure 7:
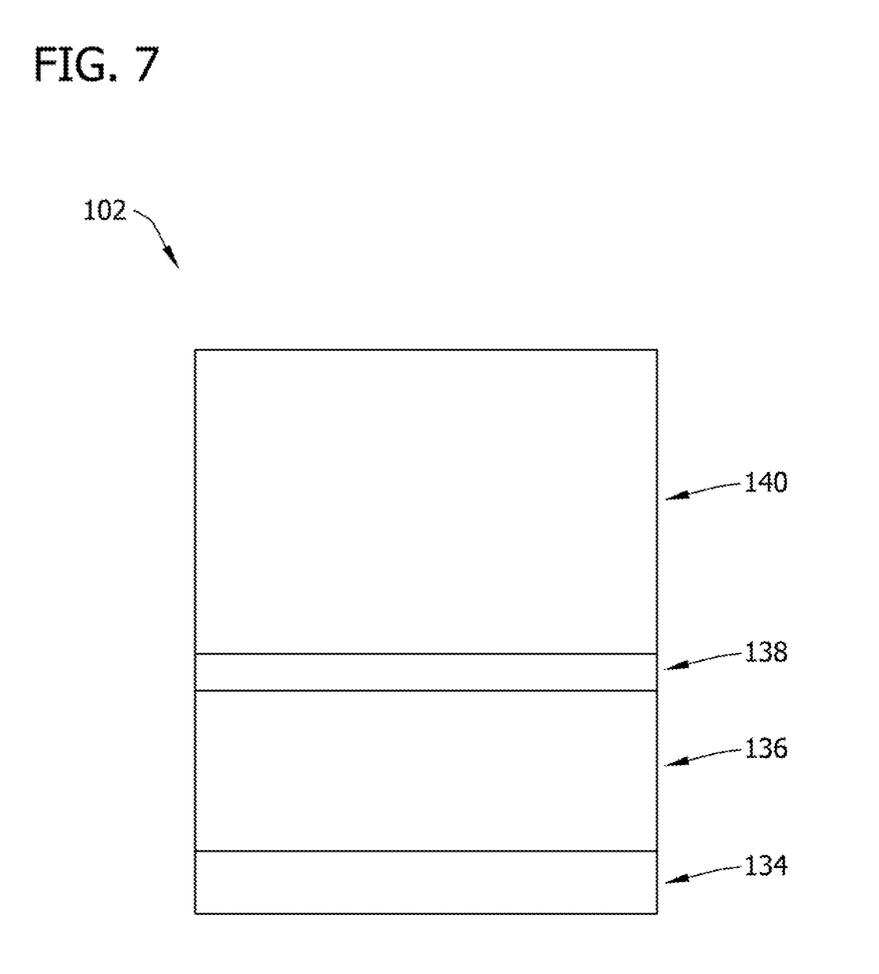
FIG. 7 shows a cross section of a flexible layer according to the present disclosure.

In one embodiment, at least some of flexible layer 102 is made of a thermally protective material to provide the thermal shielding capability. Flexible layer 102 is configured to be strong enough to withstand the aerodynamic loads of decelerating the structure in an atmosphere and also flexible enough to fold into the stowed configuration. In one embodiment, flexible layer 102 is made of a woven carbon fiber cloth as a base material. In another embodiment, flexible layer 102 is gas impermeable and covered with a flexible thermally protective material that is boned or stitched to the woven carbon fiber cloth. Shown in FIG. 7, is a cross section of an exemplary embodiment of flexible layer 102. As shown in FIG. 7, flexible layer 102 may itself contain one or more sub-layers in a stacked configuration. In one embodiment the sublayers may include one or more of a carbon fiber layer 134, an insulative layer 136, a carbon cloth layer 138 and an ablative layer 140. In embodiments, ablative layer 140 is made of an ablative material like SIRCA or PICA. In another embodiment, at least a portion of flexible layer 102 is made of a material capable of radiating heat from front and back surfaces of flexible layer 102.

Spokes 114 and links 106 are configured to transmit aerodynamic loads from flexible layer 102 to payload adaptor 104. In some embodiments, spokes 114 and links 106 are made of the same or different materials, such as insulated carbon fiber composites, non-insulated carbon-carbon composites, an insulated titanium matrix or the like. In one embodiment, spokes 114 and links 106 have a rectangular cross section up to approximately 152 mm×457 mm, but may be formed in any shape and size to allow the aerodynamic decelerator to function as described herein.

In embodiments, aerodynamic decelerator includes between 16 and 32 spokes, for example, 16, 24 or 32 spokes. In one embodiment, under an applied aerodynamic loading (e.g., during aerocapture), flexible layer 102 deflects inwardly producing a scalloped shape between spokes 114. In one embodiment, to reduce scalloping, flexible layer 102 has a thickness of approximately 0.30 mm to 0.35 mm, more particularly 0.33 mm.

Figure 8:
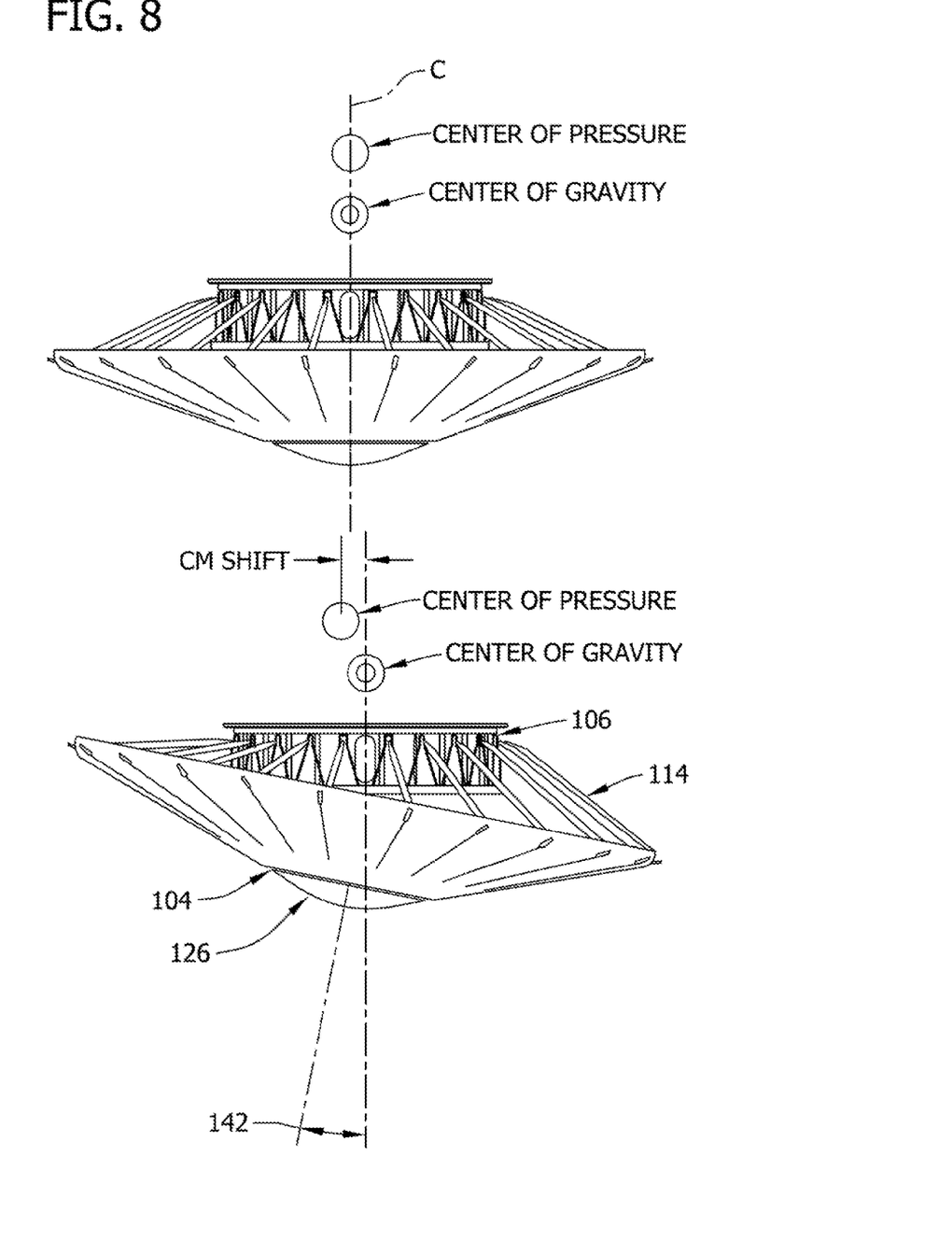
FIG. 8 shows the aerodynamic decelerator system of FIG. 1 in exemplary zero lift and lift producing configurations.

To control aerodynamic decelerator 100 during descent, control device 130 controls the center of gravity and center of pressure, as shown for example in FIG. 8 by moving the payload (not shown) and or the ring member 104. In one embodiment, control device 130 is configured to move or rotate the payload relative to aerodynamic decelerator 100 by using one or more actuators to push or pull the payload with respect to aerodynamic decelerator 100. For example, the payload may be pushed/pulled by the actuators such that the center of mass of the payload is offset from central axis C of aerodynamic decelerator 100. In another embodiment, control device 130 is configured to gimbal one or more of nose 126 and flexible layer 102 to shift the center of mass and/or center of pressure of aerodynamic decelerator 100. In one embodiment, the gimbaling is implemented by adjusting tension on cables 128 such that ring member 104 and nose 126 moves relative to central axis C, as shown in an exemplary manner in FIG. 8. In another embodiment, one or more actuators are used to push and/or pull ring member 104 and nose 126 relative to central axis C. As ring member 104 moves, spokes 114 and links 106 pivot around hinges to allow the gimbaling action and to maintain flexible layer 102 in the deployed configuration. For example, as one side of ring member 104 is pulled longitudinally upwardly with respect to central axis C, links 106 and spokes 114 on the upwardly pulled side of ring member 104 will move inwardly and upwardly and spokes 114 and links 106 on the opposite side will extend outwardly and down to maintain flexible layer 102 in the deployed configuration. In another embodiment, as shown in FIG. 8, spokes 114 include a telescopic member which translates along a longitudinal axis of spokes 114 to preserve the outer diameter of flexible layer 102 in the deployed configuration. Control device 130 is operable to gimbal the nose 126 in a frustum normal to a plane of the ring member 104. In one embodiment, a maximum excursion 142 of the gimbaling is approximately between about 10 degrees to 20 degrees, for example 12.5 degrees, from center, which provides a shift of the center of mass +/−0.7 meters in a first direction and 1.2 meters in a second direction. In other embodiments, the maximum excursion is any excursion that allows the aerodynamic decelerator to function as described herein. Control mechanism 130 is thus operable to redirect a lift vector of aerodynamic decelerator 100 to control the direction of travel of aerodynamic decelerator 100.

Figure 9:
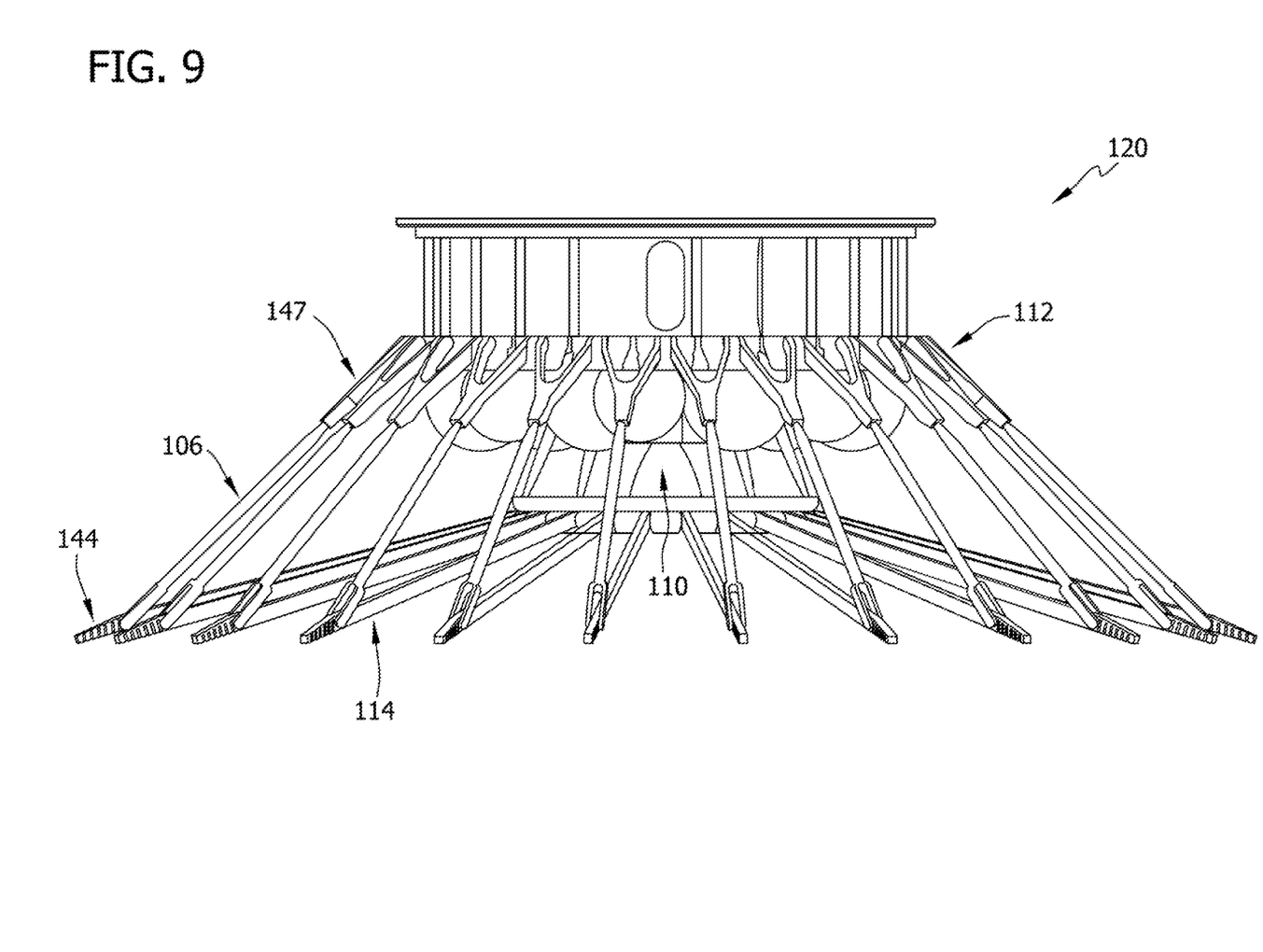
FIG. 9 shows the aerodynamic decelerator system of FIG. 1 in an exemplary landing configuration.

In one embodiment, aerodynamic decelerator 100 is reconfigurable for landing into landing configuration 120, as shown for example in FIG. 9. In one embodiment, to facilitate reconfiguration to landing configuration 120, nose 126 (not shown in FIG. 9) is ejected to expose retro-propulsion device 110. In some embodiments, cables 128 are cut using cable cutters (not shown) to facilitate ejection of nose 126. Deployment device 112 is operated to invert spokes 114 over a center of aerodynamic decelerator 100, which places spokes 114 in a position to act as landing legs. To facilitate reconfiguration into landing configuration 120, spokes 114 and/or links 106 are configured to translate inward toward a central axis C to preserve the outer diameter of flexible layer 102. In another embodiment, flexible layer 102 is flexible to an extent necessary to allow spokes 114 to invert to landing configuration 120. In one embodiment, spokes 114 include landing feet 144. In one embodiment, landing feet 144 are formed with a surface having increased traction, such as a series of grooves or notches formed therein. In yet another embodiment, feet 144 include a repositionable hinge connecting links 106 to spokes 114.

In the inverted position, flexible layer 102 (not shown in FIG. 9) acts as a protective layer to protect the payload from surface debris during landing. In another embodiment, during firing of retro-propulsion device 110, flexible layer 102 is configured to interact with the exhaust plume creating a cushioning due to ground effects before touchdown. In another embodiment, a trailing ballute 146 (FIG. 10), or parachute, is used for supplementary aerocapture during landing in conjunction with, or instead of retro-propulsion device 110. In another embodiment, links 106 are mounted by shock absorbers 147, which provide shock attenuation during landing. After touchdown/landing of aerodynamic decelerator 100, winding device 132 (shown in FIG. 5) is operable to wind cables 128 to level the payload. In another embodiment, actuators are utilized to level the payload.

Figure 10:
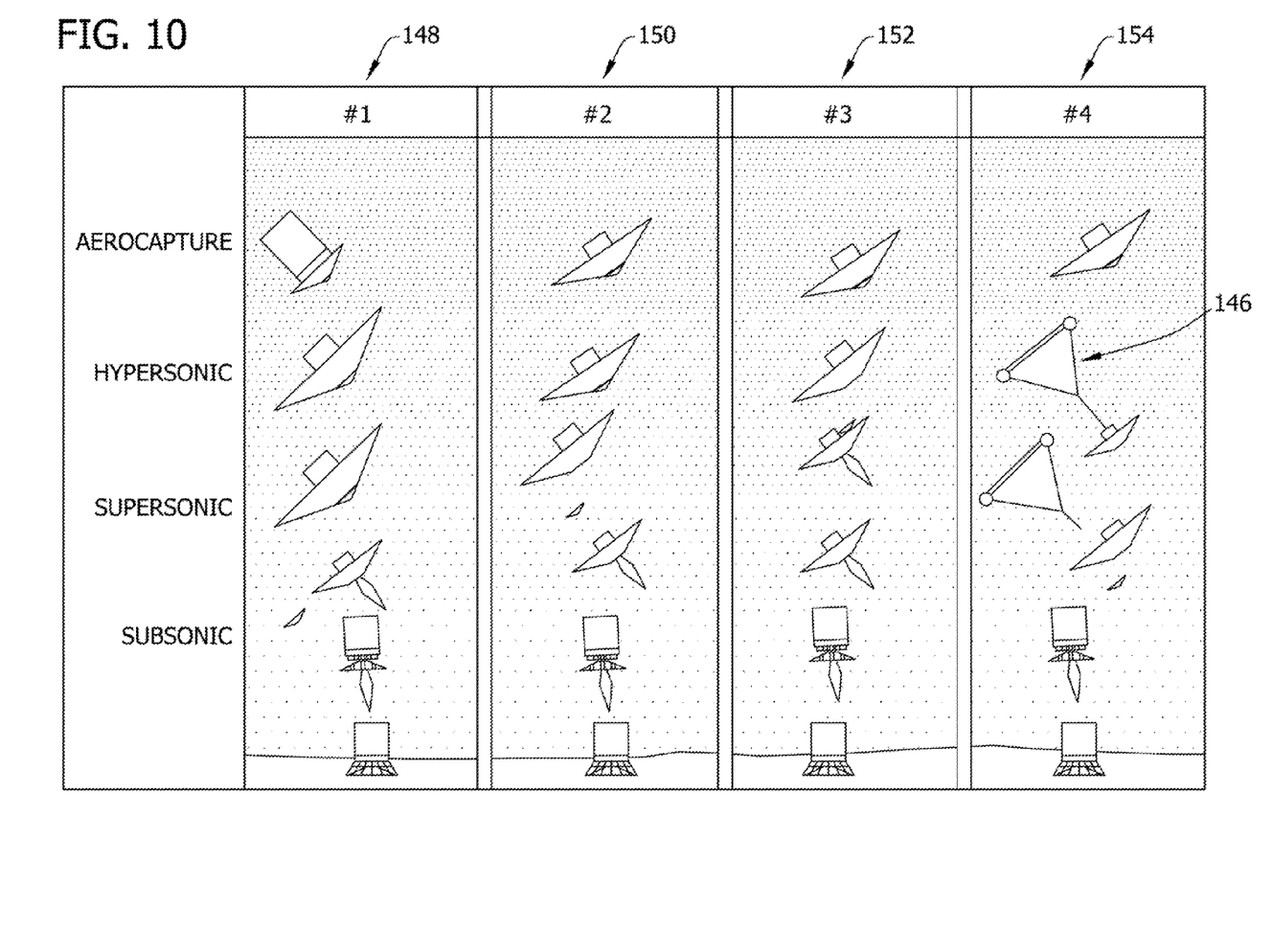
FIG. 10 shows a plurality of exemplary aerodynamic decelerators during multiple phases of entry, decent and landing.

Shown generally in FIG. 10, are four exemplary embodiments of aerodynamic decelerator 100 during a baseline mission. The baseline mission involves an aerocapture phase, a hypersonic entry phase, a supersonic entry phase, a subsonic entry phase and a landing phase. In mission profile 148, during a first phase of aerocapture, flexible material is deployed to a first outer diameter, for example 23 meters. Prior to a second phase of entry, flexible material is deployed to a second outer diameter, for example 44 meters. As such, the ratio of payload to total landing mass of the system is within a range of from about 0.55 to 0.65. For example, in one embodiment, the payload mass is 40.0 mT and the total landed mass is 67.2 mT.

In another embodiment, as shown at numeral 150, aerodynamic decelerator is deployed to a single outer diameter, for example 35 m, for both the aerocapture and entry phases of mission profile 150. As such, the ratio of payload to total landing mass of the system is within a range of from about 0.45 to 0.55. For example, in one embodiment, the payload mass is 40.0 mT and the total landed mass is 78.8 mT.

In mission profile 152, aerodynamic decelerator is deployed to a single outer diameter, for example 23 m, during aerocapture and entry, and the retro-propulsion device is activated during the supersonic phase of mission profile 152 to provide further deceleration. As such, the ratio of payload to total landing mass of the system is within a range of from about 0.5 to 0.6. For example, in one embodiment, the payload mass is 40.0 mT and the total landed mass is 65.3 mT.

In yet another embodiment, shown in mission profile 154, flexible material 102 is deployed to a single outer diameter during the aerocapture and entry phases and trailing ballute 146 is deployed during a transition from the hypersonic phase to the supersonic phase to provide further deceleration of the payload. As such, the ratio of payload to total landing mass of the system is within a range of from about 0.5 to 0.6. For example, in one embodiment, the payload mass is 40.0 mT and the total landed mass is 64.5 mT.

In some embodiments, the above described systems and methods are electronically or computer controlled. The embodiments described herein are not limited to any particular system controller or processor for performing the processing and tasks described herein. The term controller or processor, as used herein, is intended to denote any machine capable of performing the functions, calculations, or computations, necessary to perform the tasks described herein. The terms controller and processor also are intended to denote any machine that is at least capable of accepting a structured input and of processing the input in accordance with prescribed rules to produce an output. The phrase "configured to" as used herein means that the component, controller, or processor is equipped with a combination of hardware and/or software for performing the tasks of embodiments of the invention, as will be understood by those skilled in the art. The term controller/processor, as used herein, refers to central processing units, microprocessors, microcontrollers, reduced instruction set circuits (RISC), application specific integrated circuits (ASIC), logic circuits, and any other circuit or processor capable of executing the functions described herein.

The embodiments described herein may embrace one or more computer readable media, including non-transitory computer readable storage media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A deployable aerodynamic decelerator structure, comprising:
   a ring member disposed along a central axis of the aerodynamic decelerator;
   a plurality of jointed rib members extending radially from the ring member;
   a flexible layer attached to the plurality of rib members;
   a deployment device operable to reconfigure the flexible layer from a stowed configuration to a deployed configuration by movement of the rib members; and
   a control device operable to redirect a lift vector of the decelerator structure by changing an orientation of the flexible layer.

2. The decelerator structure according to claim 1, further comprising:
   an ejectable heat shield.

3. The decelerator structure according to claim 1, further comprising a retro-propulsion device, said retro-propulsion device being exposed upon deployment of the heat shield.

4. The decelerator structure according to claim 1, wherein the control device is configured to gimbal the ring member with respect to the central axis.

5. The decelerator structure according to claim 1, the deployment device operable to reconfigure the flexible layer to a landing configuration by reconfiguring the rib members into an inverted position with respect to the stowed configuration.

6. The decelerator structure according to claim 1, the deployment device comprising a payload adaptor member configured to be connected to a payload.

7. The decelerator structure according to claim 1, wherein the flexible layer has a stowed configuration diameter and a deployed configuration diameter, the deployed configuration diameter is larger than the stowed configuration diameter.

8. The decelerator structure according to claim 7, wherein the plurality of jointed rib members comprises a plurality of links hingedly attached to the rib members, the deployment device operable to move the links to change the diameter of the flexible layer.

9. An entry, decent and landing system, comprising:
a payload adaptor member configured to connect to a payload;
a ring member disposed along a central axis of the system;
a plurality of rib members hingedly connected to the ring member on one end and connected to the payload adaptor member on another end thereof;
a flexible layer attached to the plurality of rib members; and
a deployment device operable to reconfigure the flexible layer from a deployed configuration to a landing configuration by moving the ring member along the central axis.

10. The system according to claim 9, further comprising a control device operable to redirect a lift vector of the decelerator structure, wherein the control device is operable to shift the center of mass of the payload with respect to the central axis.

11. The system according to claim 9, further comprising a retro-propulsion device.

12. The system according to claim 9, further comprising a plurality of links configured to transmit aerodynamic forces acting on the flexible layer to the payload adaptor member.

13. The system according to claim 12, wherein the deployment device is operable to place the rib members into a landing configuration wherein an end portion of the rib members is configured to support the payload.

14. The system according to claim 9, wherein the flexible layer is at least partially made of a heat shielding material.

15. The system according to claim 9, further comprising a retro-propulsion device and a nose cone, the retro-propulsion device being disposed intermediate the payload and the nose cone.

16. The system according to claim 9, wherein the flexible layer comprises a carbon fabric.

17. A method of landing a payload, comprising:
providing a payload;
attaching the payload to a deployable aerodynamic decelerator structure, comprising:
a ring member disposed along a central axis of the aerodynamic decelerator;
a plurality of jointed rib members extending radially from the ring member;
a flexible layer attached to the plurality of rib members;
a deployment device operable to reconfigure the flexible layer from a stowed configuration to a deployed configuration; and
a control device operable to redirect a lift vector of the decelerator structure;
operating the deployment device to reconfigure the flexible layer into the deployed configuration to reduce a velocity of the payload; and
operating the control device to redirect the lift vector of the decelerator structure; and
operating the deployment device to reconfigure the flexible layer into a landing configuration.

18. The method according to claim 17, further comprising operating a retro-propulsion device to further reduce the velocity of the decelerator structure.

19. The method according to claim 17, further comprising operating the deployment device to reconfigure the flexible layer into a landing configuration wherein the plurality of rib members are inverted with respect to a position of the rib members in the deployed configuration.

20. The method according to claim 17, wherein operating the control device comprises sending an electronic signal to a gimbaling device to move the ring member with respect to the payload.

* * * * *